P. ERNENWEIN.
RUBBER TIRE.
APPLICATION FILED JAN. 2, 1917.

1,257,204. Patented Feb. 19, 1918.

Witness

Inventor
Phillip Ernenwein
By
Attorneys

UNITED STATES PATENT OFFICE.

PHILLIP ERNENWEIN, OF NEW YORK, N. Y.

RUBBER TIRE.

1,257,204.  Specification of Letters Patent.  Patented Feb. 19, 1918.

Application filed January 2, 1917. Serial No. 140,310.

*To all whom it may concern:*

Be it known that I, PHILLIP ERNENWEIN, a citizen of the United States, residing at New York city, in the county of New York and State of New York, have invented certain new and useful Improvements in Rubber Tires, of which the following is a specification.

This invention relates to improvements in solid rubber tires for vehicles, and more particularly relates to the larger sizes of these tires in which the tread is formed with a series of narrow pockets or recesses.

The objects of my improvement are to obtain size for size a more durable tire so constructed that the manufacture thereof will be facilitated, the application thereof to the wheel more readily accomplished and repairs thereto more easily and cheaply made.

A further object of the invention is to devise a tire of the type referred to, the tread of which will be anti-skidding in its nature and also one so formed that the strain upon the sections of rubber between the notches will be lessened to a marked extent while the carrying capacity remains unimpaired.

Referring to the drawings:—

Figure 1:
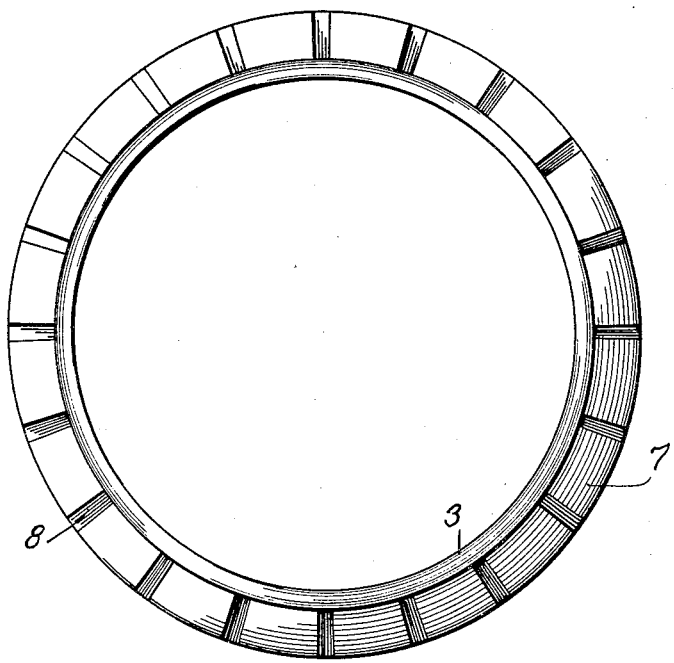
Figure 1 is a side elevation of a tire embodying my improvements.
Figure 2:
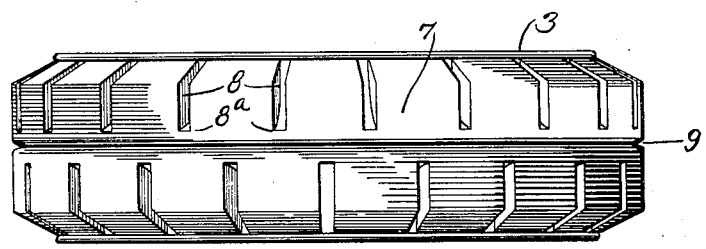
Fig. 2 is a top plan of the same.
Figure 3:
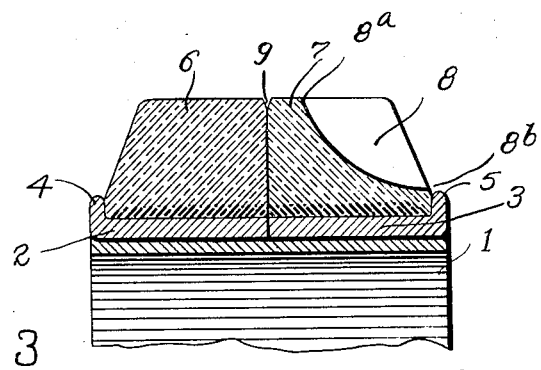
Fig. 3 is a transverse section of a portion of the same.

In the drawings, 1 represents the steel band which it is usual to apply to the felly (not shown) of the wheel. The tire rim is formed in two sections 2 and 3 secured to the metallic band 1 and the felly in any suitable way and preferably provided with peripheral flanges 4 and 5. The rubber tire proper is also formed in two separate continuous lengths 6 and 7, the bases of which are preferably formed of hard rubber or vulcanite and are vulcanized to the channel sections.

Each of the rubber bands is provided with a series of relatively deep recesses or pockets 8 which extend from a point removed from the inner side of the band, as indicated at 8ª, to a point at or near the base on the outer side of the band, as indicated at 8ᵇ. It will also be noticed that the extreme upper edge of each recess, or that point indicated by 8ª is formed on longitudinally straight lines so as to give the recesses a substantial width at the tread.

By the vulcanization of the tire elements 6 and 7 to the rim sections there is provided between the tire elements and the rim sections a bond or anchorage of continuous character, coextensive with the area of the meeting faces of said tire elements and rim sections and uniform at all points. This bond or anchorage aids the blocks or webs of material between the recesses 8 in effectively resisting stresses set up when there is tendency to skid, notwithstanding the relatively deep formation of said recesses.

The inner side of each rubber band is formed on straight lines at right-angles to the base so that when the bands are assembled in the channel they may be made to lie closely against each other except at the extreme outer tread where the bands are slightly inclined away from each other so as to provide a peripheral groove 9. When the tire is assembled, the rubber bands will be so placed relative each other that the recesses or pockets will be staggered as shown.

By the construction described it will be seen that I have devised a tire which is really a dual tire, but in appearance a single tire, such a tire having many advantages over a single tire of the same dimensions in the manufacture thereof, the application of the same to the wheel and in the making of repairs; also it is more convenient to handle and one of the tires could be replaced in case of injury without disturbing the other. Furthermore, by forming the rubber in two continuous bands, there is a tendency to lessen the strain on any given section while the carrying capacity of a single band or tire of equal size of both bands is retained and there is also a tendency to prevent skidding, the peripherally-arranged groove opening up when the tire slides, thereby resisting the side motion. There is also an added advantage in the vulcanization of the tire, as the smaller mass of rubber with the recesses permits a more even cure.

Having thus described my invention, I claim:—

1. A dual solid rubber tire structure having in combination a rim formed of counterpart, continuous, annular members adapted to be mounted in abutting lateral juxtaposition on a common support, each member having an annular flange circumscribing its outer margin and a pair of structurally independent, continuous, annular counterpart sections of solid rubber vulcanized on the respective members, said sections laterally abutting said flanges, having transversely straight tread faces and having their inner side faces in laterally abutting relation and in planes normal to their inner circumferential faces, said sections also having transverse relatively deep recesses arranged at regular intervals and opening to their tread and outer side faces, the bases of said recesses extending from points adjacent the margins of said flanges to points short of the center of the tire.

2. A dual solid rubber tire structure having in combination a rim formed of counterpart, continuous, annular members adapted to be mounted in abutting lateral juxtaposition on a common support, a pair of structurally independent, continuous, annular, counter-part sections of solid rubber vulcanized on the respective members, said sections having transversely straight tread faces and having their inner side faces in lateral abutting relation and in planes normal to their inner circumferential faces, said sections also having transverse relatively deep recesses arranged at regular intervals and opening to the tread and outer side faces, the bases of said recesses extending from points somewhat close to said rim to points short of the center of the tire.

In testimony whereof, I have hereunto set my hand this 18th day of December 1916.

PHILLIP ERNENWEIN.

Witnesses:
FREDERICK A. SEAMAN,
HERBERT B. DELAPINE.